(12) United States Patent
Link

(10) Patent No.: US 7,413,251 B2
(45) Date of Patent: Aug. 19, 2008

(54) VEHICLE SEAT, PARTICULARLY FOR A MOTOR VEHICLE, COMPRISING A FOLDING BACK REST AND A FOLDABLE SEAT BASE AND METHOD

(75) Inventor: Walter Link, Langenfeld (DE)

(73) Assignee: Johnson Controls GmbH, Burscheid (DE)

( * ) Notice: Subject to any disclaimer, the term of this patent is extended or adjusted under 35 U.S.C. 154(b) by 3 days.

(21) Appl. No.: 10/590,163

(22) PCT Filed: Nov. 6, 2004

(86) PCT No.: PCT/EP2004/012584

§ 371 (c)(1),
(2), (4) Date: Aug. 21, 2006

(87) PCT Pub. No.: WO2005/080127

PCT Pub. Date: Sep. 1, 2005

(65) Prior Publication Data

US 2007/0063564 A1 Mar. 22, 2007

(30) Foreign Application Priority Data

Feb. 17, 2004 (DE) ........................ 10 2004 007 863

(51) Int. Cl.
*B60N 2/36* (2006.01)
*B60N 2/00* (2006.01)
(52) U.S. Cl. .................................. 297/334; 297/378.12
(58) Field of Classification Search ................. 297/334, 297/378.12
See application file for complete search history.

(56) References Cited

U.S. PATENT DOCUMENTS

| | | | |
|---|---|---|---|
| 3,001,820 A | | 9/1961 | Morphew |
| 3,957,312 A | * | 5/1976 | Bonnaud ............. 297/378.12 X |
| 4,382,629 A | | 5/1983 | Froumajou |
| 4,390,205 A | | 6/1983 | Louis |
| 4,536,027 A | * | 8/1985 | Brennan ............. 297/378.12 X |
| 4,637,653 A | * | 1/1987 | Yoshida et al. ............... 297/334 |
| 5,044,683 A | * | 9/1991 | Parsson .............. 297/378.12 X |
| 5,482,349 A | * | 1/1996 | Richter et al. ........ 297/378.12 X |
| 5,527,087 A | * | 6/1996 | Takeda et al. ........ 297/378.12 X |
| 5,542,745 A | * | 8/1996 | Takeda et al. ........... 297/378.12 |
| 5,570,931 A | * | 11/1996 | Kargilis et al. ......... 297/378.12 |
| 5,588,707 A | * | 12/1996 | Bolsworth et al. ...... 297/378.12 |
| 5,641,202 A | * | 6/1997 | Rus ..................... 297/378.12 X |

(Continued)

FOREIGN PATENT DOCUMENTS

DE 4136363 A1 5/1993

(Continued)

OTHER PUBLICATIONS

International Search Report for International Application No. PTC/EP2004/012574; date of mailing Mar. 24, 2005; 3 pages.

*Primary Examiner*—Rodney B. White
(74) *Attorney, Agent, or Firm*—Foley & Lardner LLP

(57) ABSTRACT

An apparatus and method for adjusting a vehicle seat having a backrest and a seat base by moving the backrest and seat base at the same time to one of a normal position and a loading position. A transmission that may include a drive is provided and may further include a lock mechanism coupled to the vehicle seat.

11 Claims, 7 Drawing Sheets

U.S. PATENT DOCUMENTS

| | | | |
|---|---|---|---|
| 5,658,046 A * | 8/1997 | Rus | 297/378.12 X |
| 5,738,411 A * | 4/1998 | Sutton et al. | 297/378.12 |
| 5,826,942 A * | 10/1998 | Sutton et al. | 297/378.12 |
| 5,954,398 A * | 9/1999 | Namba et al. | 297/378.12 X |
| 6,070,934 A * | 6/2000 | Schaefer et al. | 297/378.12 X |
| 6,070,939 A * | 6/2000 | Matsuo et al. | 297/378.12 |
| 6,152,533 A * | 11/2000 | Smuk | 297/378.12 X |
| 6,170,913 B1 * | 1/2001 | Seibold et al. | 297/378.12 X |
| 6,183,033 B1 * | 2/2001 | Arai et al. | 297/378.12 X |
| 6,193,317 B1 * | 2/2001 | Mitschelen et al. | 297/378.12 X |
| 6,196,613 B1 * | 3/2001 | Arai | 297/334 X |
| 6,568,756 B2 * | 5/2003 | Sugimoto et al. | 297/334 X |
| 6,578,919 B2 * | 6/2003 | Seibold et al. | 297/334 X |
| 6,598,926 B1 * | 7/2003 | Price et al. | 297/334 X |
| 6,629,730 B2 * | 10/2003 | Makosa | 297/378.12 X |
| 6,655,738 B2 * | 12/2003 | Kammerer | 297/378.12 |
| 6,685,269 B1 * | 2/2004 | Freijy et al. | 297/334 |
| 6,773,067 B2 * | 8/2004 | Kim | 297/334 |
| 6,899,392 B1 * | 5/2005 | Saberan et al. | 297/334 |
| 6,902,236 B2 * | 6/2005 | Tame | 297/378.12 |
| 6,908,155 B1 * | 6/2005 | Wieclawski | 297/378.12 |
| 6,981,744 B2 * | 1/2006 | Elterman et al. | 297/378.12 |
| 7,014,263 B2 * | 3/2006 | Mukoujima et al. | 297/334 |
| 7,040,684 B2 * | 5/2006 | Tame et al. | 297/378.12 |
| 7,059,681 B2 * | 6/2006 | Kubo | 297/378.12 |
| 7,100,984 B2 * | 9/2006 | Epaud et al. | 297/378.12 |
| 7,134,725 B2 * | 11/2006 | Hofmann et al. | 297/334 |
| 7,152,921 B2 * | 12/2006 | Saberan | 297/378.12 |
| 7,252,337 B2 * | 8/2007 | Hofmann et al. | 297/334 X |
| 7,255,399 B2 * | 8/2007 | White et al. | 297/378.12 |
| 7,300,107 B2 * | 11/2007 | Kammerer | 297/334 X |
| 2003/0006637 A1 * | 1/2003 | Jach et al. | 297/378.12 X |
| 2004/0056521 A1 * | 3/2004 | Kayumi et al. | 297/334 |
| 2006/0103174 A1 * | 5/2006 | Queveau et al. | 297/378.12 X |

FOREIGN PATENT DOCUMENTS

| | | |
|---|---|---|
| DE | 10156644 A1 | 6/2003 |
| DE | 10157748 A1 | 6/2003 |
| FR | 2471162 | 6/1981 |
| FR | 2577860 A1 | 8/1986 |

* cited by examiner

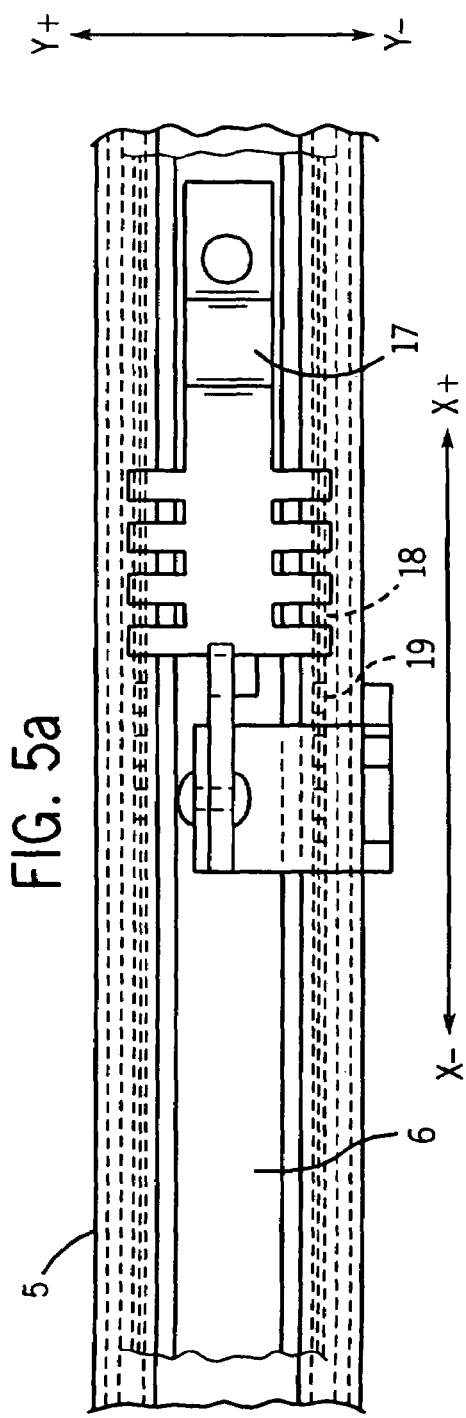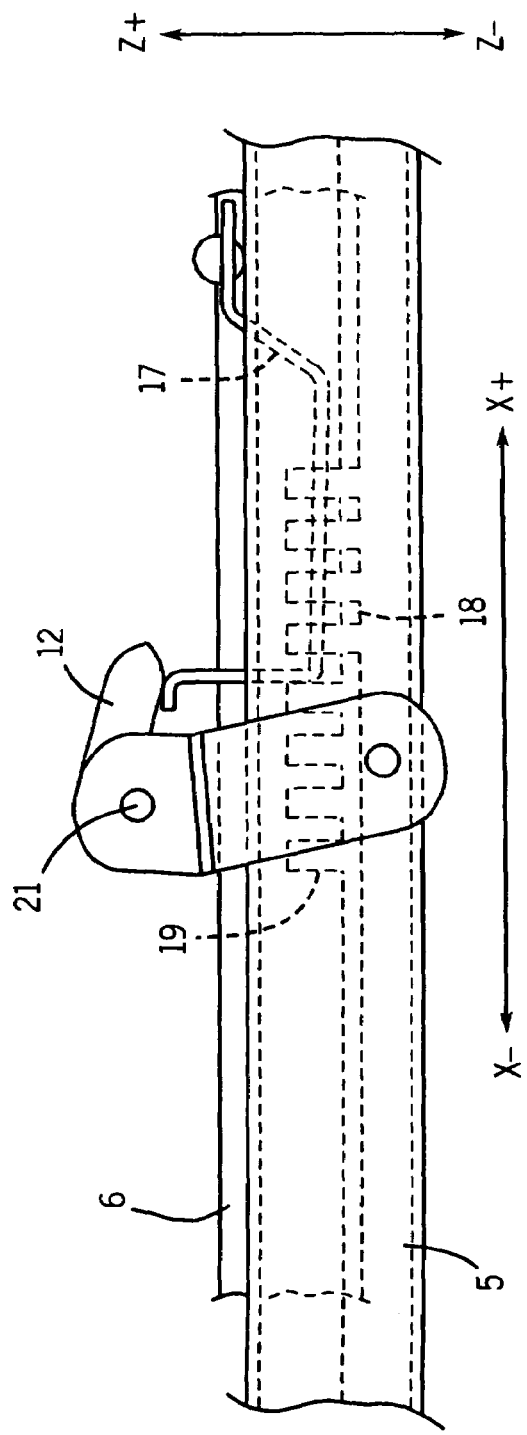

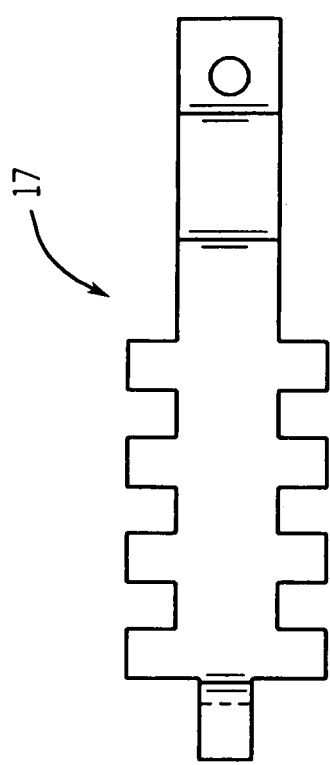
FIG. 6a
FIG. 6b
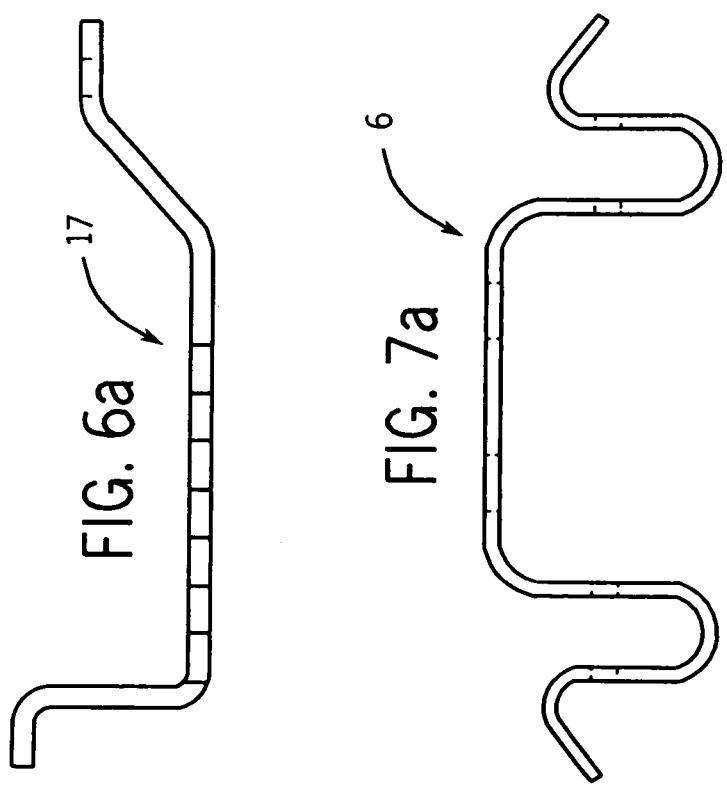
FIG. 7a
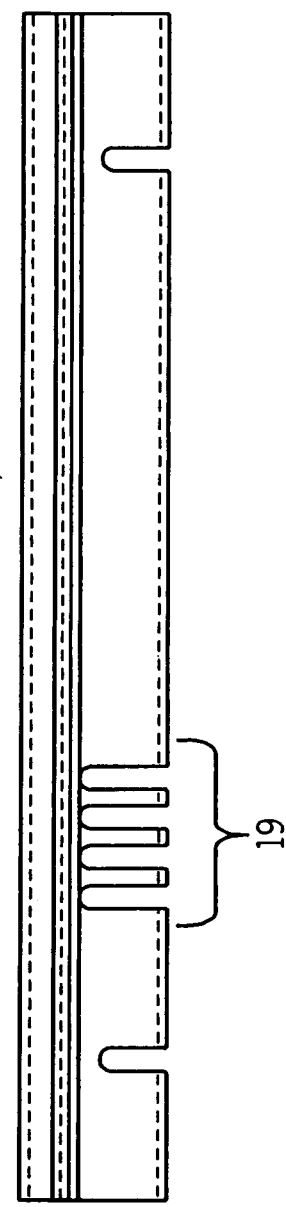
FIG. 7b

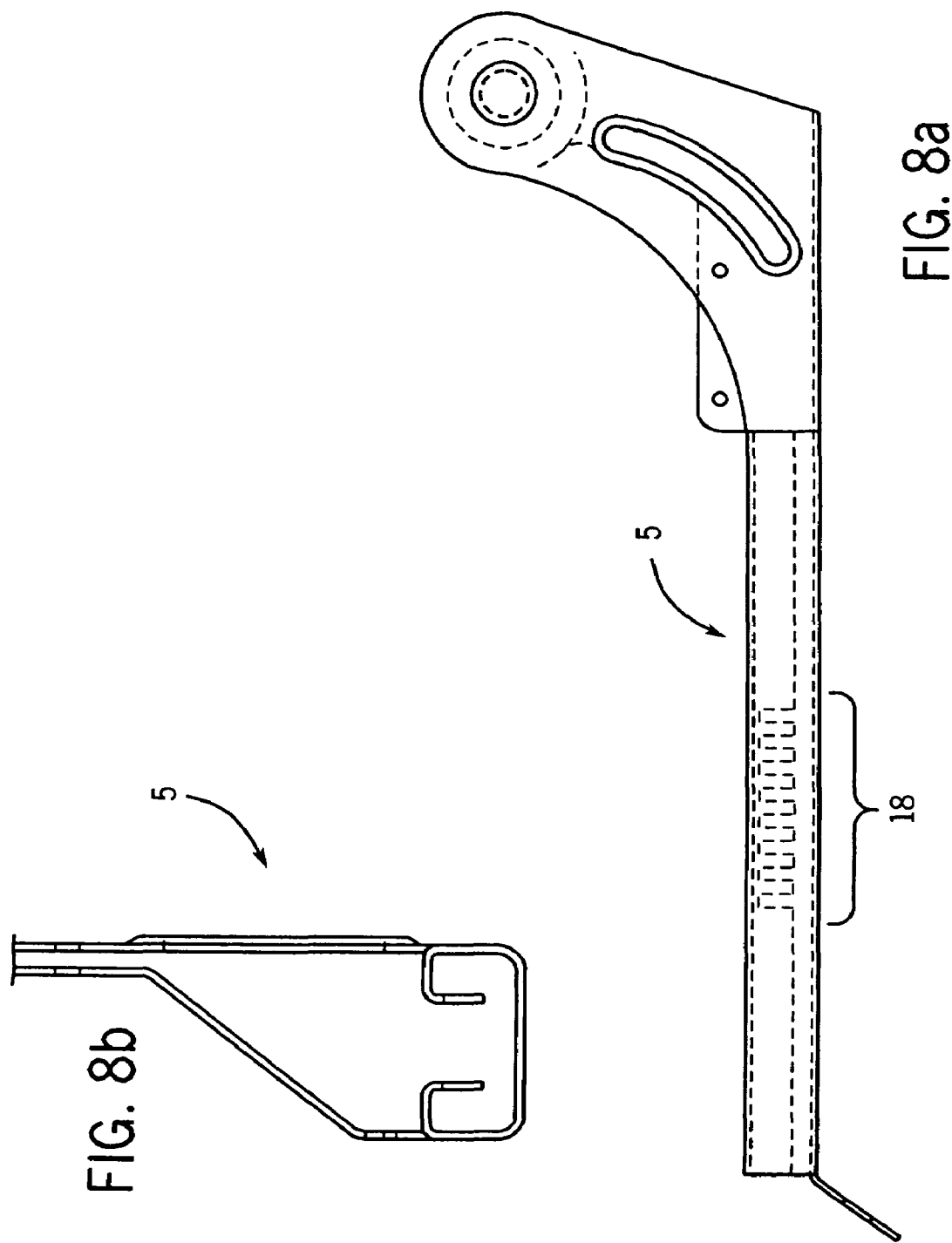

VEHICLE SEAT, PARTICULARLY FOR A MOTOR VEHICLE, COMPRISING A FOLDING BACK REST AND A FOLDABLE SEAT BASE AND METHOD

CROSS-REFERENCE TO RELATED PATENT APPLICATIONS

This application is a National Stage of International Application No. PCT/EP2004/012584, filed Nov. 6, 2004 which claims priority to German Application No. 102004007863.7, filed Feb. 17, 2004, the entire disclosure of both applications are incorporated herein by this reference.

BACKGROUND OF THE INVENTION

The invention relates to a vehicle seat, particularly for a motor vehicle, comprising a backrest, a seat part and a seat base, the backrest being able to be set into a first position and into a second position by being pivotable relative to the seat part about a first rotary spindle arranged essentially transversely with respect to the main seating direction, and the seat base being able to be set into a third position and into a fourth position by being pivotable relative to the seat part about a second rotary spindle arranged essentially transversely with respect to the main seating direction.

Vehicle seats of this type are known in general and serve, for example, to enlarge the loading area of a motor vehicle. A disadvantage of the known solutions is that a user generally has a plurality of awkward operations in order to change the seat position, i.e., on the one hand, to enlarge the loading area and, on the other hand, to reverse the seat adjustment again, for example for normal transportation of individuals.

Thus, there is a need for a vehicle seat, particularly a rear seat of a motor vehicle, that the vehicle seat can be set rapidly and with few maneuvers or just with one maneuver from its loading position into its normal position and vice versa.

SUMMARY OF THE INVENTION

Such advantages are achieved according to an exemplary embodiment by a vehicle seat which has a backrest, a seat part and a seat base, the backrest being able to be set into a first position and into a second position by being pivotable relative to the seat part about a first rotary spindle arranged essentially transversely with respect to the main seating direction, the seat base being able to be set into a third position and a fourth position by being pivotable relative to the seat part about a second rotary spindle arranged essentially transversely with respect to the main seating direction, and the vehicle seat furthermore having a transmission in such a manner that a pivoting movement of the backrest from the first position into the second position is coupled to a pivoting movement of the seat base from the third position into the fourth position. By this means, it is possible that the pivoting movement both of the backrest and of the seat base is possible by a single maneuver, i.e., for example, by moving the backrest or else by moving the seat base or else by actuation of a drive which adjusts both the backrest and the seat base. This makes it possible to considerably simplify the manipulation of the vehicle seat into the one or other position and also to carry it out more rapidly.

It is preferred that the spatial region taken up by the backrest in the second position at least partially overlaps the spatial region taken up by the seat base in the third position. The effect achieved by this is that a particularly large change in the capacity of the loading space is possible by the fact that the seat back or the backrest is set comparatively flat to be precise, in a region in which the seat base or the seat cushion part was at least partially arranged beforehand.

Furthermore, it is preferred that the first and second rotary spindles are provided essentially parallel to each other, essentially horizontally and, in the main seating direction, essentially at opposite ends of the seat part. The effect firstly achieved by this is that the possibility of adjustment can be realized in a particularly simple and robust manner and, secondly, that, in turn, the capacity of the loading space can be considerably enlarged by the backrest being fastened rotatably, for example, in the rear part of the seat part and the seat base being fastened rotatably in the front part of the seat part, so that, by folding the backrest downward and by folding the seat base upward, a gain in space in the longitudinal direction can be realized of the order of magnitude of the length of the seat back or of the backrest.

Furthermore, it is preferred if the transmission comprises a first rail and a second rail, with, on the one hand, a fifth position of the rails relative to each other corresponding to the first position of the backrest and the third position of the seat base, and, on the other hand, a sixth position of the rails relative to each other corresponding to the second position of the backrest and the fourth position of the seat base. By this means, it is possible, according to an exemplary embodiment, for an adjusting mechanism to be configured, in the case of a vehicle seat, in a particularly compact manner in terms of construction space and therefore also comparatively cost-effectively.

Furthermore, it is preferred that a longitudinal displacement of the rails relative to each other takes place between the fifth position of the rails and the sixth position of the rails. In this case, the longitudinal displacement of the rails is particularly preferred and the element connecting the adjustment of the backrest and the seat base is particularly advantageous.

Furthermore, it is preferred that the vehicle seat has a lock in such a manner that the rails can be locked with respect to a longitudinal displacement. In general, the lock brings about a locking of the transmission irrespective of the manner in which the transmission is configured. In an exemplary embodiment, the setting of the vehicle seat or the setting of the backrest and of the seat base can advantageously be provided in a lockable manner from the expanded and improved possibilities of adjusting the vehicle seat.

In another embodiment a drive is assigned to the rails or in general to the transmission in such a manner that a setting of the rails from their fifth position into their sixth position can be brought about. The drive can be provided in a particularly convenient manner that the adjustment of the backrest and of the seat base is configured in a manner such that it can be automated and therefore such that it is advantageously even more convenient than is possible solely by connecting the adjustment of the backrest to the adjustment of the seat base via the transmission. Furthermore, this embodiment advantageously opens up the possibility of using the drive both for adjusting the backrest and for adjusting the seat base.

It is preferred that the drive is provided by one of an electrical pneumatical and hydraulic actuator, for example a linear actuator, for the adjustment of the seat.

There is also provided a method for adjusting the backrest and the seat base of a vehicle seat, the setting of the backrest from its first position into its a second position and the setting of the seat base from its third position into its fourth position taking place at the same time. By this means, it is possible in a particularly advantageous manner to design the adjustment of the vehicle seat to be particularly rapid and also particularly simple for a user.

Furthermore, it is preferred that the setting of the backrest from its second position into its first position and the setting of the seat base from its fourth position into its third position also take place at the same time. By this means, it is particularly advantageously possible that the accelerated adjustment of the vehicle seat can be used for both directions, i.e. both for setting the loading position and for setting the normal position.

BRIEF DESCRIPTION OF THE DRAWINGS

FIG. 5a is a top view of an exemplary embodiment of a lock mechanism for a vehicle seat;

FIG. 5b is a side view of the lock mechanism illustrated in FIG. 5a;

FIG. 6a is a side plan view of a clamp in the lock mechanism illustrated in FIG. 5a;

FIG. 6b is a top view of the clamp illustrated in FIG. 6a;

FIG. 7a is an end view of a second (upper) rail in the lock mechanism illustrated in FIG. 5a;

FIG. 7b is a side plan view illustration of the second rail illustrated in FIG. 7a;

FIG. 8a is a side plan view of a first (lower rail of the lock mechanism illustrated in FIG. 5a;

FIG. 8b is an end view illustration of the first rail illustrated in FIG. 8a.

DETAILED DESCRIPTION OF THE EXEMPLARY EMBODIMENTS

The seat according to an exemplary embodiment is provided in particular as a rear seat of a motor vehicle and comprises a seat base which can be pivoted out and adjusted, an adjustable and pivotable seat back or backrest, and a transmission means realized, by way of example, by means of two rails, the rails being displaceable horizontally one inside the other. In order to enlarge the loading area, the seat back or the backrest can be pivoted from the upright position (which is variable within limits) toward the rails or toward the floor platform into a horizontal cargo position or loading position. In order to take up this loading position, it is provided that the seat base or the seat cushion part is pivoted out in advance, so that the backrest can at least partially take up the space or the spatial region of the seat base. For this purpose, in order to avoid a collision between the seat base or the upholstery of the seat base and the seat back or the backrest, this seat base already has to be swung over with respect to the backrest from the use position into the loading position or into the cargo position before the seat back is swung forward into the essentially horizontal position. For this purpose, by way of example, the seat base is driven via a swinging articulated arm by the upper of the two rails and via the lower rail. During the pivoting of the backrest, which, for its part, is connected to the lower rail, for example via a separate main strut, an intermediate joint and a carry-along joint fitted on the upper rail are used to trigger a displacement of the upper rail and therefore to bring about a pivoting out of the seat base. As the seat back is being placed into an upright position by a hand movement or via a mechatronically caused displacement of the upper rail on the lower rail, the same device brings about the automatic pivoting in of the seat base and the raising of the seat back. In this manner, it is possible to enlarge the loading space of a vehicle and to increase the ease of operation for the folding-over of the seat back with little structural outlay and to reduce the maneuvering to a minimum.

Figure 1:
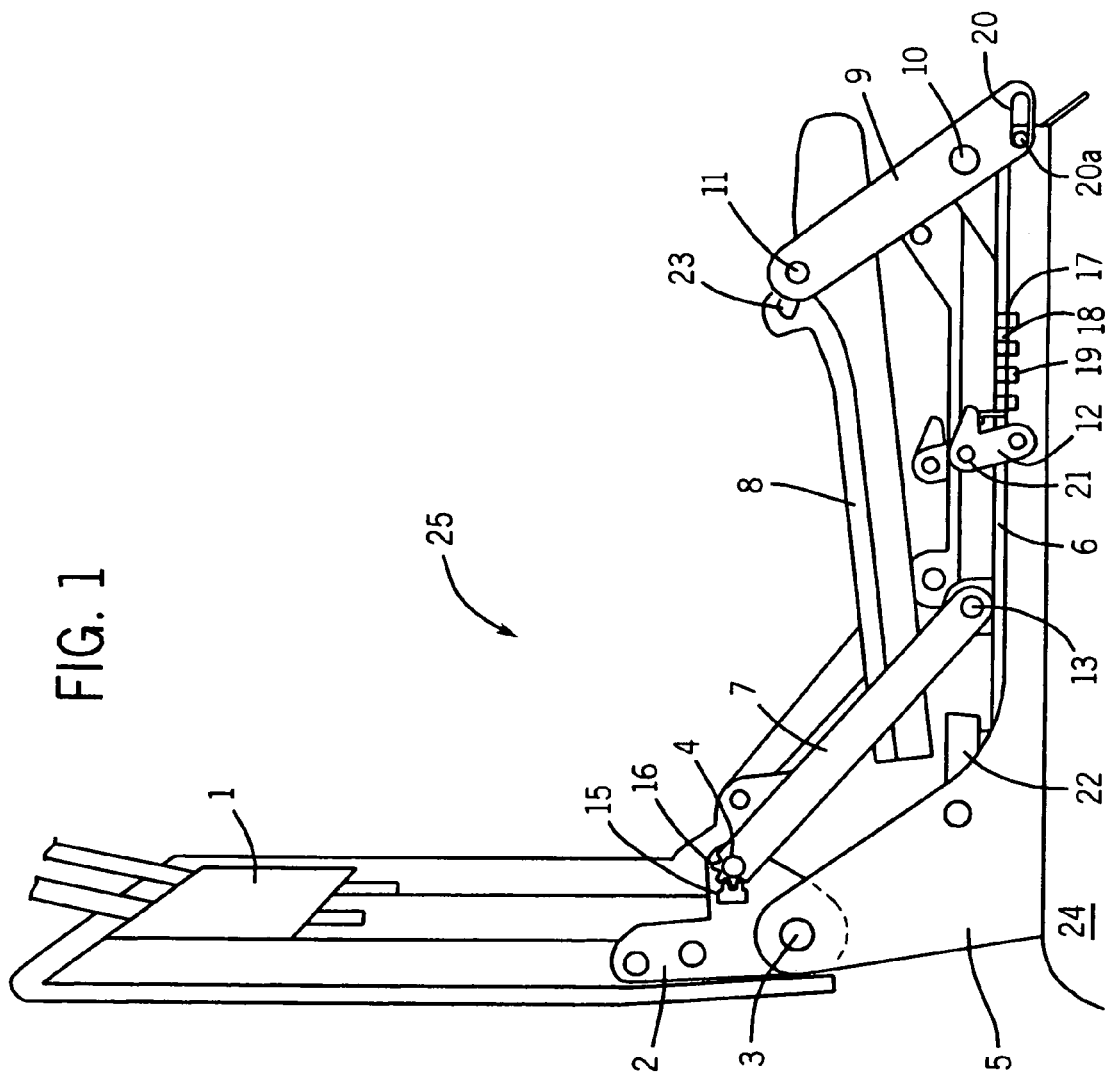
FIG. 1 is a side view of an exemplary embodiment of a vehicle seat in a normal position.
Figure 2:
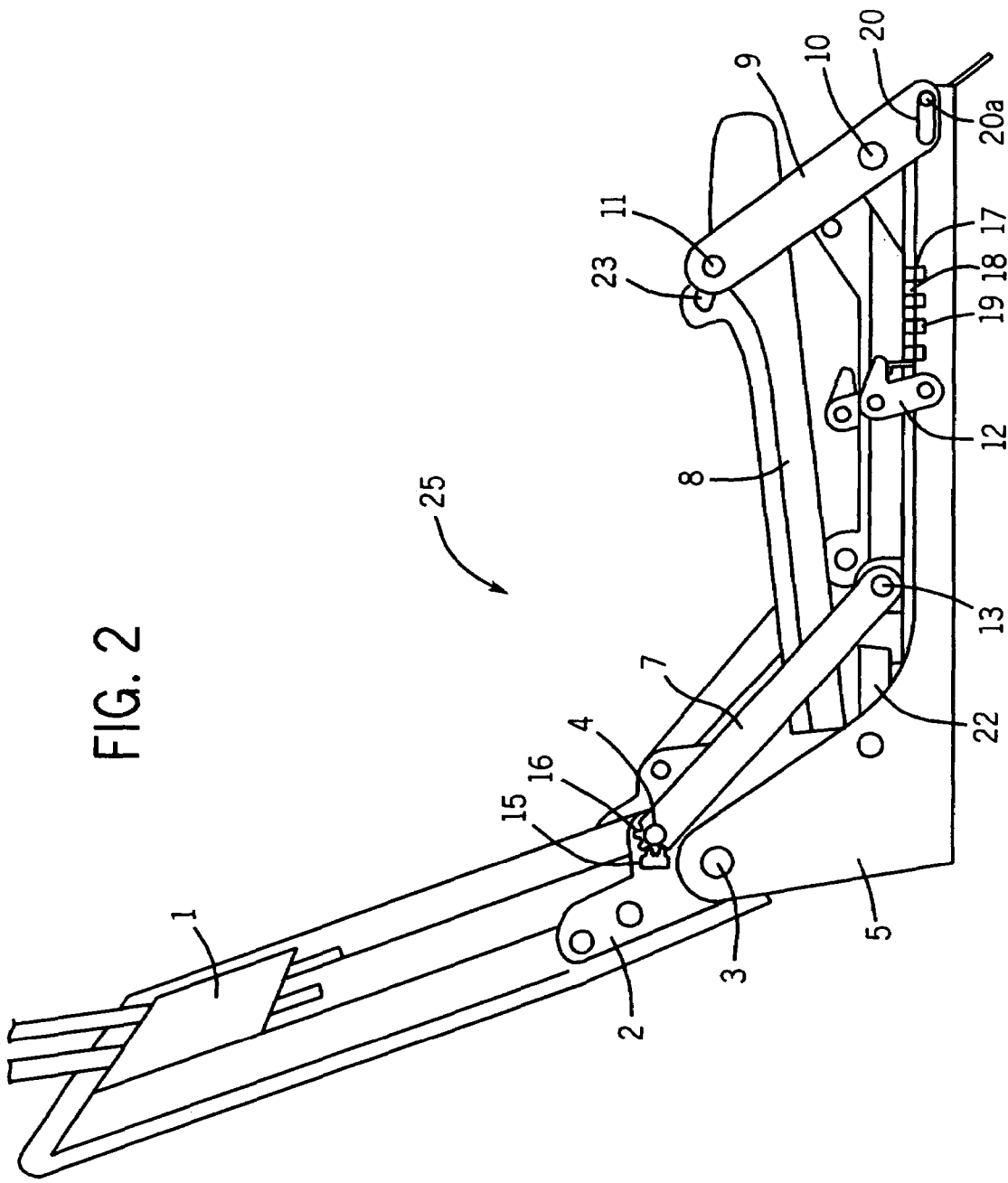
FIG. 2 is a side view of the vehicle seat in an alternative normal position.

FIGS. 1 and 2 each illustrate side views of a vehicle seat 25 and of its structure-forming parts in two normal positions. The normal positions are distinguished in that the vehicle seat 25 can be used as a seat for an occupant of a vehicle or a motor vehicle, i.e. that a seat back 1 or backrest 1 of the vehicle seat 25 is arranged essentially vertically or inclined slightly to the rear and that a seat base 8 is arranged essentially horizontally—in a position also referred to as the first seat base position. FIG. 1 illustrates a seat back position, which is also referred to below as the first seat back position, in which the backrest 1 is set somewhat more vertically, and FIG. 2 illustrates a position of the vehicle seat 25, in which the backrest 1 is set somewhat inclined to the rear. The backrest can be varied between these two positions without the seat base moving.

Figure 3:
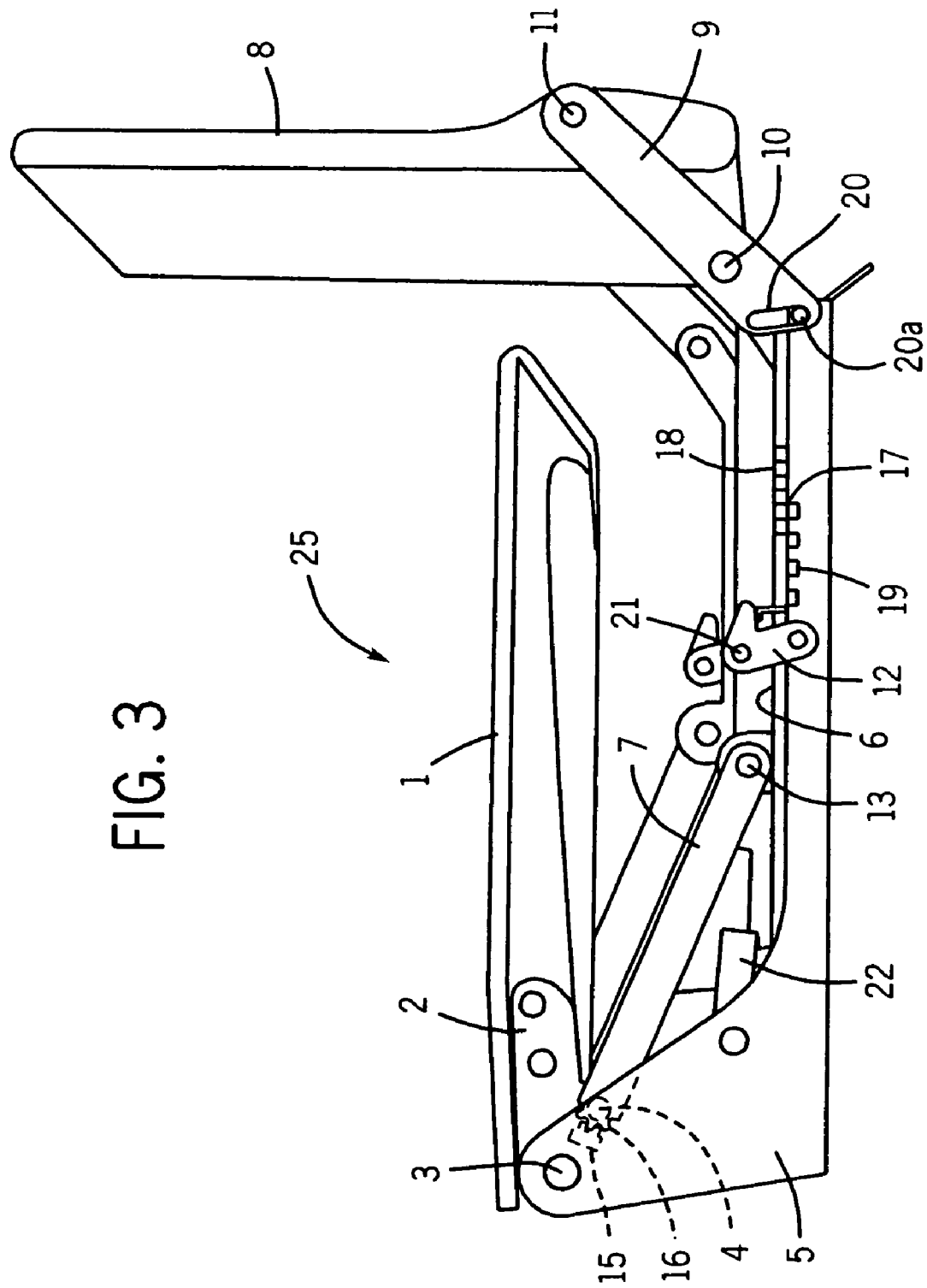
FIG. 3 is a side view of the vehicle seat illustrated in FIG. 1 in a loading position.
Figure 4:
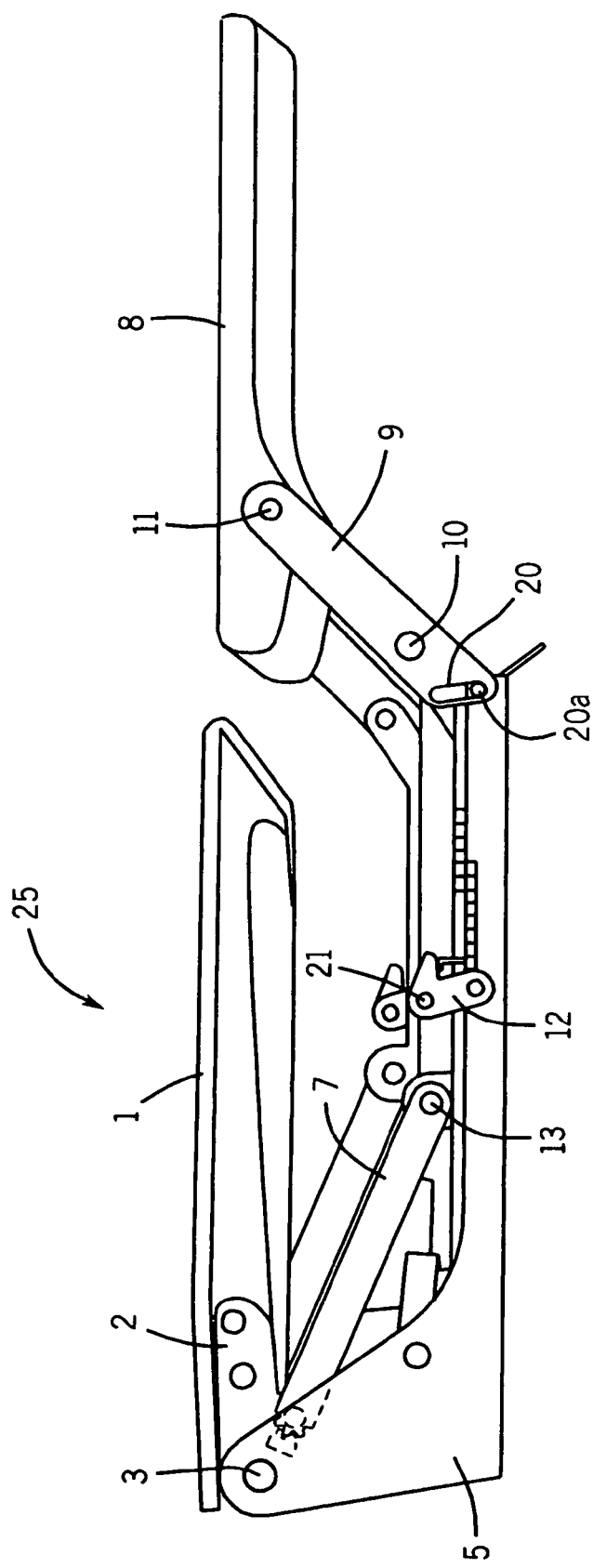
FIG. 4 is a side view of the vehicle seat illustrated in FIG. 1 in an alternative loading position.

FIGS. 3 and 4 show the vehicle seat 25 and its structure-forming parts in two different loading positions which are also referred to as cargo positions. The seat back 1 here is in each case arranged essentially horizontally in a position which is also referred to as the second seat back position, and the seat base 8 is provided in a manner in which it is unfolded from its folded-in position in the normal position, and in the unfolded position is either set essentially vertically—which is also referred to below as the second seat base position and which is illustrated in FIG. 3—or is set essentially horizontally as illustrated in FIG. 4.

The vehicle seat 25 illustrated in FIGS. 1 to 4 comprises a first (lower) rail 5 and a second (upper) rail 6. According to an exemplary embodiment, the rails 5, 6 are provided, in particular, on both sides of the seat 25 thus making it also possible to speak of a lower pair of rails 5 and of an upper pair of rails 6. However, it could equally well also be possible for the two rails 5, 6 to be arranged only, for example, in the center or on one side of the seat 25. One of the pairs of rails 5, 6, in particular the lower one or one of the rails 5, 6 is fastened, for example screwed, to the vehicle body (not illustrated). Alternatively, the pair of rails connected fixedly to the body can also be fastened to a seat substructure. The pair of rails fixed in such a manner or the fixed rail is also referred to below as the "seat part" and is provided in FIG. 1 with the reference number 24. The situation in which an upper and a lower rail 5, 6 is arranged in each case on both sides of the seat 25 is discussed below.

The vehicle seat 25 furthermore comprises the seat base 8 and the backrest 1 which are normally provided with cushion elements (not illustrated). At its rear end, the lower pair of rails 5 comprises a pair of upwardly protruding tabs. A main point of articulation 3, through which a rotary spindle 3 passes, is arranged thereon. With regard to the first rotary spindle 3 or the main point of articulation 3, the backrest 1 is connected rotatably to the lower rail 5. This is realized by way of example by means of a "main strut" 2 which is connected fixedly to the backrest 1 and is likewise connected rotatably about the first rotary spindle 3 to the lower rail 5 or to the first rail 5. The main strut 2, which can likewise be provided as a pair of main struts 2 on both sides of the seat 25, or the backrest 1 is connected rotatably by means of a first joint 4 to "carry-along joints" 7 (or to one carry-along joint 7), the carry-along joint 7 being connected rotatably on its side opposite the first joint 4 via a second joint 13 to the upper rail 6 or, in the embodiment on both sides, to the upper pair of rails 6. The arrangement of joints brings about a pivoting or tilting of the backrest 1 about the first rotary spindle 3 or a displacement in the longitudinal direction of the rails 5, 6, with the relative position of the rails 5, 6 before the forward movement of the backrest 1 (i.e. the relative position of the rails 5, 6 that is illustrated in FIG. 1) being referred to as the first rail position, and the relative position of the rails 5, 6 after the forward movement of the backrest 1 (i.e. the relative position of the rails 5, 6 that is illustrated in FIG. 3) being referred to as the second rail position.

The above disclosed embodiment of a vehicle seat 25 permits a three-point kinematic arrangement which resembles an oblique-angled triangle between the main point of articulation 3 or the first rotary spindle 3, the first joint 4 and the second joint 13 and which, in the normal position or use position, forms an angle between the alignments of first rotary spindle 3 and first joint 4, on the one hand, and first joint 4 and second joint 13, on the other hand, with, in the cargo position illustrated in FIGS. 3 and 4, an essentially aligned arrangement between first rotary spindle 3, first joint 4 and second joint 13 being provided, although, even in the cargo position, a complete alignment should not be provided.

At the front end of the seat 25, a displacement of the rails 5, 6 causes the seat base 8 to rotate about a second rotary spindle 10. The second rotary spindle 10 is provided on the upper rail 6, so that the seat base 8 is connected at least indirectly to the upper rail 6 at the second rotary spindle 10. However, in the region of the second rotary spindle 10, the seat base 8 is also connected at least indirectly to the lower rail 5, so that a displacement of the rails 5, 6 leads to a pivoting of the seat base 8. In the present exemplary embodiment of the seat 25, the seat base 8 is connected to a rocker-type articulated arm 9, the rocker-type articulated arm 9 being connected to the upper rail 6 at the second rotary spindle 10 and being connected to the lower rail 5 by means of an elongated slot 20.

According to an exemplary embodiment, the seat base 8 can either be connected rigidly to the rocker-type articulated arm 9 or the seat base 8 can be coupled rotatably to the rocker-type articulated arm 9 via a pivot joint 11, so that a rotation of the seat base 8 about the pivot joint 11 is possible (as apparent by comparing FIGS. 3 and 4), with, however, a stop 23, indicated in FIGS. 1 and 2, preventing the seat base 8 being pivotable with respect to the rocker-type articulated arm 9 further, than illustrated in FIG. 3, in the direction of the lower rail 5. This has the effect that, when the rocker-type articulated arm 9 is pivoted out by a displacement of the rails 5, 6, the seat base 8 is also carried along, i.e. is pivoted out about the second rotary spindle 10. The displacement of the rails 5, 6 therefore results in a coupled, synchronous kinematic control of the four-point kinematic arrangement between the second joint 13, which is mounted in a horizontally rotatable manner on the upper rail 6, and the second rotary spindle 10 (also referred to as the third joint 10 below), and which is mounted on the same upper rail 6 in a horizontally rotatable manner in the front region of the seat 25 and, in the example, is connected to the seat base 8 via the rocker-type articulated arm 9.

In the rear region of the seat 25, the seat base 8 is mounted or supported on a support 22 on the lower rail 5 or on the upper rail 6. In such an embodiment, a parallelogram is produced between the second joint 13, the second rotary spindle 10, the pivot joint 11 and the support 22, which parallelogram is essentially closed upward in the use position and, on the basis of a displacement of the rails 5, 6, is pivoted open synchronously in a limited and controlled manner, as illustrated in FIG. 3. In the case of a horizontal, manual pivoting over of the seat base 8 about the pivot joint 11, starting from the cargo position illustrated in FIG. 3, an expanded cargo position, as depicted in FIG. 4, arises which, when the seat 25 is folded back into its use position, also has to be folded over again manually.

According to an exemplary embodiment, the carry-along joint 7 is provided at the first joint 4 in particular with a shaped toothing 16 which is arranged in a further shaped toothing 15 on the backrest 1 or on the main strut 2. Such an arrangement of the carry-along joint produces a controllable three-point kinematic arrangement between the main point of articulation 3 and the first joint 4. A movement can now take place from two directions: either, starting from a movement of the backrest 1 (or of the seat base 8), a displacement of the rails 5, 6 can be brought about or, by means of a displacement of the rails 5, 6, a movement of the backrest 1 and of the seat base 8 can be brought about. In the front region of the seat 25, in the case of the position of the seat base 8 with respect to the rocker-type articulated arm 9 that is illustrated in FIGS. 1 and 3, the rocker-type articulated arm 9 is aligned essentially perpendicularly with respect to the seat base 8. A cam 20*a* connected to the lower rail 5 engages in the elongated slot 20 provided on the rocker-type articulated arm 9, as a result of which a slightly changed setting of the backrest 1, i.e. in different normal positions, owing to the elongated hole 20, does not lead to a movement of the seat base 8 or of the rocker-type articulated arm 9; on the contrary, this only actually takes place when an essentially complete forward folding of the backrest 1 is initiated.

A drive for the seat adjustment of the seat 25 can be seen in arranging a rotatable threaded rod (not illustrated) in the region of the rails 5, 6, so that a rotation of the threaded rod leads to a displacement of the rails 5, 6 one inside the other and therefore to a movement of the seat parts. Use can equally well also be made, of any desired actuator, for example, electric, pneumatic and/or hydraulic linear drive for displacing the rails. Use should preferably be made of a drive which leads to a locking of the arrangement, so that lock mechanisms are no longer required. This is the case, for example, when a threaded rod is used. The rails 5, 6 are therefore displaced only when the drive is actuated in order to rotate the threaded rod, and are therefore also unlocked. By means of such a solution, the backrest can be set in an infinitely variable manner (in the normal position) and the seat adjustment between normal position and cargo position is also possible in an infinitely variable manner.

If an automatic drive of the seat 25 for the seat adjustment is not provided, another exemplary embodiment makes provision for a locking of the movement mechanism of the seat 25 to be provided by a lock mechanism. According to an exemplary embodiment, for example, in a toothing 18 on the lower rail 5 and a further toothing 19 on the upper rail 6. By means of a clamp 17, which is preferably fastened to the upper rail 6 and which can engage in the toothing 18, 19 of the rails 5, 6, a locking of the seat is possible. As a result, the end position of the backrest 1 in the normal position of the seat 25 can be defined, with the clamp 17 then bringing about a locking when the toothings 18, 19 lie congruently one above the other. This is the case in a plurality of normal positions of the seat 25, i.e. for a plurality of angles of inclination of the backrest 1 in its normal position, cf. FIGS. 1 and 2, because, for example, the toothing 18 has a larger number of gaps than the clamp 17 has teeth. The additional, expanded adjustment of the backrest in the normal position is limited by the number of gaps in the toothing 18 and by the length of the elongated hole 20. The clamp 17 can be designed as a spring and can be provided in a manner such that it can be unlocked via an unlocking lever 12. According to an exemplary embodiment, the toothings 18, 19 are, in particular, only lockable in the use position or normal position of the seat or of the backrest 1. By this means, a stepped pivoting of the seat back into the use position and a controlled lowering of the backrest are possible with the use of a single blocking device or locking device or lock mechanism. In order to prevent an occupant from sitting down on a seat 25 which is not yet locked in the use position, it can also be provided that a spring element (not illustrated) is provided. between the rails 5, 6 in such a manner that the spring tension pulls the seat into the cargo position and only when locking has taken place does the spring element no longer exert any force on the user. This spring force can also provide the occupant with an easy and synchronous frictional connection to assist in the adjustment of the seat back.

FIGS. 5a, 5b to 8a, 8b illustrate details of an exemplary embodiment of a lock mechanism. FIG. 5a illustrates, a plan view of an upper and lower rail 5, 6 together with the clamp 17. FIG. 5b illustrates a side view of upper and lower rail 5, 6 together with their toothings 18, 19, the clamp 17 and the unlocking lever 12, which is fastened via a third joint 21. In this case, the positive Z axis refers to the vertical axis of the vehicle in the upward direction, the positive X axis refers here to the longitudinal axis of the vehicle in the direction of travel, and the positive Y axis refers here to the transverse axis of the vehicle in such a manner that a clockwise-rotating coordinate system arises from the X, Y and Z axes. FIG. 6a illustrates a side view and, FIG. 6b illustrates a plan view of the clamp 17. FIG. 7a illustrates a front end view and, FIG. 7b illustrates a side view of the upper rail 6. FIG. 8b illustrates a front view and, FIG. 8a illustrates a side view of the lower rail 5. The clamp 17 can be provided riveted to the upper rail 6.

What is claimed is:

1. A vehicle seat (25), particularly for a motor vehicle, comprising a backrest (1), a seat part (24) and a seat base (8), the backrest (1) being able to be set into a first seat back position and into a second seat back position by being pivotable relative to the seat part (24) about a first rotary spindle (3) arranged essentially transversely with respect to a main seating direction, and the seat base (8) being able to be set into a first seat base position and into a second seat base position by being pivotable relative to the seat part (24) about a second rotary spindle (10) arranged essentially transversely with respect to the main seating direction, including in the vehicle seat (25) a transmission configured in such a manner that a pivoting movement of the backrest (1) from the first seat back position into the second seat back position is coupled to a pivoting movement of the seat base (8) from a first seat base position into a second seat base position, wherein the transmission comprises a first rail (5) and a second rail (6), with a first rail position of the rails (5, 6) relative to each other corresponding to the first seat back of the backrest (1) and the first seat base position of the seat base (8) and, a second rail position of the rails (5, 6) relative to each other corresponding to the second seat back position of the backrest (1) and the second seat base position of the seat base (8), and wherein a longitudinal displacement of the rails (5, 6) relative to each other takes place between the first rail position of the rails (5, 6) and the second rail position of the rails (5, 6).

2. The vehicle seat (25) as claimed in claim 1, wherein a spatial region taken up by the backrest (1) in the second seat back position at least partially overlaps a spatial region taken up by the seat base (8) in the first seat base position.

3. The vehicle seat (25) as claimed in claim 1, wherein the first and second rotary spindles (3, 10) are provided essentially parallel to each other, essentially horizontally and, in the main seating direction, essentially at opposite ends of the seat part (24).

4. The vehicle seat (25) as claimed in claim 1, wherein the vehicle seat has a locking means in such a manner that the rails (5, 6) can be locked with respect to a longitudinal displacement.

5. The vehicle seat (25) as claimed in claim 1, wherein a drive is coupled to the rails (5, 6) wherein, a setting of the rails (5, 6) from the first rail position into the second rail position can be brought about.

6. The vehicle seat (25) as claimed in claim 5, wherein the drive is one of an electric actuator, pneumatic actuator and a hydraulic actuator.

7. The vehicle seat (25) as claimed in claim 1, wherein the setting of the backrest (1) from the first seat back position into the second seat back position and the setting of the seat base (8) from the first seat base position into the second seat base position take place at the same time.

8. The vehicle seat (25) as claimed in claim 7, wherein the setting of the backrest (1) from the second seat back position into the first seat back position and the setting of the seat base (8) from the second seat base position into the first seat base position take place at the same time.

9. A method for adjusting a vehicle seat including a backrest and a seat base, the method comprising:

moving the backrest from a first seat back position to a second seat back position; and moving the seat base from a first seat base position to a second seat base position, wherein the moving of the backrest and the seat base occurs at the same time due to a transmission with rails that couple the backrest to the seat base and are displaced longitudinally relative to each other and the vehicle seat is in a cargo position.

10. The method for adjusting a vehicle seat of claim 9, wherein moving of the backrest from the second seat back position to the first seat back position occurs at the same time as moving the seat base from the second seat base position to the first seat base position, and the vehicle seat is in a normal position.

11. A method for adjusting a vehicle seat including a backrest, a seat part, a seat base and a transmission, the transmission comprising a first rail and a second rail, the method comprising:

providing the backrest (1) being able to be set into a first seat back position and into a second seat back position by being pivotable relative to the seat part (24) about a first rotary spindle (3) arranged essentially transversely with respect to a main seating direction;

providing the seat base (8) being able to be set into a first seat base position and into a second seat base position by being pivotable relative to the seat part (24) about a second rotary spindle (10) arranged essentially transversely with respect to the main seating direction;

coupling a pivoting movement of the backrest (1) from the first seat back position to the second seat back position to a pivoting movement of the seat base (8) from the first seat base position into the second seat base position with the transmission;

providing the transmission with a first rail position of the rails (5, 6) relative to each other corresponding to the first seat back position of the backrest (1) and the first seat base position of the seat base (8), and a second rail position of the rails (5, 6) relative to each other corresponding to the second seat back position of the backrest (1) and the second seat base position of the seat base (8); and displacing the rails longitudinally relative to each other between the first rail position of the rails (5, 6) and the second rail position of the rails (5, 6).

* * * * *